(12) United States Patent
Ban et al.

(10) Patent No.: US 11,988,898 B2
(45) Date of Patent: May 21, 2024

(54) LIGHT-EMITTING DIODE GLASSES, CONTROL SYSTEM FOR MULTIPLE LIGHT-EMITTING DIODE GLASSES, AND CONTROL METHOD THEREFOR

(71) Applicant: NEOFECT CO., LTD., Yongin-si (KR)

(72) Inventors: Hoyoung Ban, Yongin-si (KR); Hyang Jung Kim, Yongin-si (KR); Han Sirk Seo, Seongnam-si (KR); Daehoon Won, Seoul (KR); Sungjun Roh, Seoul (KR); Young Geun Choi, Yongin-si (KR)

(73) Assignee: NEOFECT CO., LTD., Yongin-si (KR)

( * ) Notice: Subject to any disclaimer, the term of this patent is extended or adjusted under 35 U.S.C. 154(b) by 685 days.

(21) Appl. No.: 17/161,100

(22) Filed: Jan. 28, 2021

(65) Prior Publication Data

US 2021/0157174 A1    May 27, 2021

Related U.S. Application Data

(63) Continuation of application No. 16/680,750, filed on Nov. 12, 2019, now Pat. No. 10,935,816, which is a
(Continued)

(30) Foreign Application Priority Data

Jul. 24, 2014  (KR) ......................... 10-2014-0093686
Dec. 12, 2014  (KR) ......................... 10-2014-0179714

(51) Int. Cl.
*G02C 11/00*    (2006.01)
*G02B 27/01*    (2006.01)
(Continued)

(52) U.S. Cl.
CPC ............ *G02C 11/10* (2013.01); *G02B 27/017* (2013.01); *G02C 5/143* (2013.01); *G02C 11/04* (2013.01);
(Continued)

(58) Field of Classification Search
None
See application file for complete search history.

(56) References Cited

U.S. PATENT DOCUMENTS 5,841,507 A    11/1998  Barnes
6,350,275 B1    2/2002  Vreman et al.
(Continued)

FOREIGN PATENT DOCUMENTS

CN    101563642 A    10/2009
JP    5523098 B2    6/2014
(Continued)

OTHER PUBLICATIONS

Korean Office Action for corresponding Korean Patent Application No. 10-2014-0093686 dated Oct. 16, 2015.
(Continued)

*Primary Examiner* — Darryl J Collins
(74) *Attorney, Agent, or Firm* — Studebaker & Brackett PC

(57) ABSTRACT

The present disclosure relates to a pair of light emitting diode eyeglasses. The light emitting diode eyeglasses include an eyeglass frame that comprises a pair of leg frames and a front frame that is provided with a plurality of light emitting diodes, a communication module for communicating one or more pattern data with a control terminal unit, a control unit that is provided in the eyeglass frame and configured to control driving of the light emitting diodes such that the pattern data is displayed through the light emitting diodes, and a power supply unit that is provided for each leg frame of at least one of the pair of leg frames, and configured to supply electric power to the light emitting diodes, the memory unit, the communication module, and the control unit.

12 Claims, 16 Drawing Sheets

Related U.S. Application Data continuation of application No. 16/528,887, filed on Aug. 1, 2019, now Pat. No. 10,509,240, which is a continuation of application No. 15/371,859, filed on Dec. 7, 2016, now Pat. No. 10,409,090, which is a continuation of application No. PCT/KR2015/007520, filed on Jul. 21, 2015.

(51) Int. Cl.
| | | |
|---|---|---|
| G02C 5/14 | (2006.01) | |
| G02C 11/04 | (2006.01) | |
| G06F 3/14 | (2006.01) | |
| G06F 3/16 | (2006.01) | |
| G09G 3/14 | (2006.01) | |
| G09G 3/32 | (2016.01) | |

(52) U.S. Cl.
CPC .............. *G06F 3/14* (2013.01); *G06F 3/16* (2013.01); *G09G 3/14* (2013.01); *G09G 3/32* (2013.01); *G02B 2027/014* (2013.01); *G02B 2027/0178* (2013.01); *G09G 2330/021* (2013.01); *G09G 2340/14* (2013.01)

(56) References Cited

U.S. PATENT DOCUMENTS

| | | | |
|---|---|---|---|
| 7,828,434 B2 | 11/2010 | Coulter et al. | |
| 9,851,588 B2 | 12/2017 | Lopez-Garcia | |
| 10,409,090 B2 | 9/2019 | Ban | |
| 10,509,240 B2 | 12/2019 | Ban | |
| 2008/0191965 A1* | 8/2008 | Pandozy | A61H 5/00 345/8 |
| 2011/0037606 A1 | 2/2011 | Boise | |
| 2012/0215291 A1* | 8/2012 | Pugh | A61N 5/0601 607/93 |
| 2013/0293830 A1 | 11/2013 | Lopez-Garcia | |
| 2015/0036323 A1* | 2/2015 | Kelly | G09F 9/33 362/103 |
| 2015/0053067 A1* | 2/2015 | Goldstein | G09B 15/023 84/609 |

FOREIGN PATENT DOCUMENTS

| | | |
|---|---|---|
| KR | 20-0244150 Y1 | 10/2001 |
| KR | 10-2009-0027715 A | 3/2009 |
| KR | 10-1060446 B1 | 8/2011 |
| KR | 20-2014-0000110 U | 1/2014 |

OTHER PUBLICATIONS

International Search Report dated Nov. 27, 2015 for PCT/KR2015/007520.

An Office Action mailed by the Korean Intellectual Property Office dated Nov. 15, 2018, which corresponds to Korean Patent Application No. 10-2016-0110847 and is related to U.S. Appl. No. 15/371,859; with English translation.

An Office Action mailed by the State Intellectual Property Office of the People's Republic of China dated Jul. 30, 2018, which corresponds to Chinese Patent Application No. 201580027110.X and is related to U.S. Appl. No. 15/371,859; with English translation.

An Office Action mailed by the Korean Intellectual Property Office dated Sep. 25, 2019, which corresponds to Korean Patent Application No. 10-2018-0127895 and is related to U.S. Appl. No. 16/528,887; with English translation.

* cited by examiner

LIGHT-EMITTING DIODE GLASSES, CONTROL SYSTEM FOR MULTIPLE LIGHT-EMITTING DIODE GLASSES, AND CONTROL METHOD THEREFOR

CROSS-REFERENCE TO RELATED APPLICATIONS

The present application is a continuation of U.S. patent application Ser. No. 16/680,750, filed on Nov. 12, 2019, which is a continuation of U.S. patent application Ser. No. 16/528,887, filed on Aug. 1, 2019, which is a continuation of U.S. patent application Ser. No. 15/371,859, filed on Dec. 7, 2016, which is a continuation of International Patent Application No. PCT/KR2015/007520, filed on Jul. 21, 2015, which is based upon and claims the benefit of priority to Korea Patent Application No. 10-2014-0093686, filed on Jul. 24, 2014 and Korea Patent Application No. 10-2014-0179714, filed on Dec. 12, 2014. The disclosures of the above-listed applications are hereby incorporated by reference herein in their entirety.

BACKGROUND

Embodiments of the inventive concept described herein relate to a pair of light emitting diode eyeglasses, and a system and a method for controlling a plurality of pairs of light emitting diode eyeglasses, and more particularly to a pair of light emitting diode eyeglasses, and a system and a method for controlling a plurality of pairs of light emitting diode eyeglasses in which a plurality of light emitting diodes are mounted on the eyeglass frames of the plurality of pairs of light emitting diode eyeglasses to show various patterns through the plurality of light emitting diodes.

According to the related art, eyeglasses equipped with light emitting diodes for securing a bright field of view at night or in dark places while the user wears the eyeglasses are known.

However, the conventional pair of light emitting diode eyeglasses intensively illuminates a side which the glaze of the user faces, and are limited to work or activities at night or in dark places.

Meanwhile, light emitting diode eyeglasses for presenting a fun to a counterpart or displaying a message or an emotion state have recently been distributed.

Korean Patent No. 10-1060446 discloses a conventional pair of light emitting diode eyeglasses for presenting a fun to a counterpart or displaying a message or an emotion state.

As disclosed, the conventional pair of light emitting diode eyeglasses displays various patterns, such as a text, an image, a number, and special symbols, through a plurality of light emitting diodes mounted on a front frame of an eyeglass frame that covers the eyes of the user.

Further, the conventional pair of light emitting diode eyeglasses selects pattern data desired by the user, which will be displayed by using light emitting diodes, from a storage unit after storing the pattern data in advance, to display the pattern data through the light emitting diodes.

However, because the conventional pair of light emitting diode eyeglasses may display only pattern data stored in a storage unit in advance and thus new pattern data have to be newly stored in the pair of light emitting diode eyeglasses through an external device (not illustrated) to be displayed, display of the new pattern is restricted and troublesome.

SUMMARY

Embodiments of the inventive concept provide a pair of light emitting diode eyeglasses, and a system and a method for controlling a plurality of pairs of light emitting diode eyeglasses, by which pattern data stored in advance may be shown and new pattern data may be shown on the spot conveniently through real-time communication.

In accordance with an aspect of the inventive concept, there is provided a pair of light emitting diode eyeglasses. The light emitting diode eyeglasses include an eyeglass frame that includes: a control unit; a pair of leg frames, each of which includes a first end attached to the front frame and a second end that is opposite to the first end and configured to be positioned on each ear of a user; and a front frame including a plurality of light emitting diodes. The light emitting diode eyeglasses also include a communication module configured to communicate one or more pattern data with a control terminal unit. In the light emitting diode eyeglasses, each second end of the pair of leg frames includes a power supply unit, and the power supply unit is configured to supply electric power to the plurality of light emitting diodes of the front frame, the communication module, and the control unit, the control unit is configured to control the plurality of light emitting diodes of the front frame to display the pattern data over the plurality of light emitting diodes, the front frame includes a plurality of openings for securing a field of view of a front side of the user, the plurality of openings are arranged in a plurality of lines, each line of openings is parallel along a lengthwise direction of the front frame, lines of openings are positioned at each of a left-center portion and a right-center portion of the front frame, the left-center portion and right-center portion are configured to correspond to a left eye position and right eye position of the user, respectively, and the lines of openings are positioned with a first longitudinal interval, the plurality of light emitting diodes are arranged as a matrix shape with a second transverse interval and a second longitudinal interval, and each of the plurality of openings is arranged between each line of the plurality of light emitting diode by the first longitudinal interval that is same as the second longitudinal interval.

In accordance with another aspect of the inventive concept, a pair of light emitting diode eyeglasses including an eyeglass frame that includes a pair of leg frames and a front frame that is connected to ends of the pair of leg frames and is provided with a plurality of light emitting diodes, a memory unit which is provided in the eyeglass frame and in which one or more first pattern data are stored, a communication module for communicating one or more second pattern data with a control terminal unit, and a control unit that is provided in the eyeglass frame to control driving of the light emitting diodes such that the first pattern data or the second pattern data are displayed through the light emitting diodes.

In accordance with another aspect of the inventive concept, there is provided a method of controlling a plurality of pairs of light emitting diode eyeglasses by using a control terminal unit and a server, each pair of light emitting diode eyeglasses including a communication module, the method including allowing the plurality of pairs of light emitting diode eyeglasses and the control terminal unit to access the server, receiving pattern data from the server, by the plurality of pairs of light emitting diode eyeglasses, and displaying the pattern data on the plurality of pairs of light emitting diode eyeglasses.

In accordance with another aspect of the inventive concept, there is provided a system for controlling a plurality of pairs of light emitting diode eyeglasses by using a control terminal unit and a server, each pair of light emitting diode eyeglasses including a communication module, the system including a plurality of pairs of light emitting diode eyeglasses that output pattern data, a control terminal unit that controls the plurality of pairs of light emitting diode eyeglasses, and a server that transmits the pattern data to the plurality of pairs of light emitting diode eyeglasses.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

Figure 1:
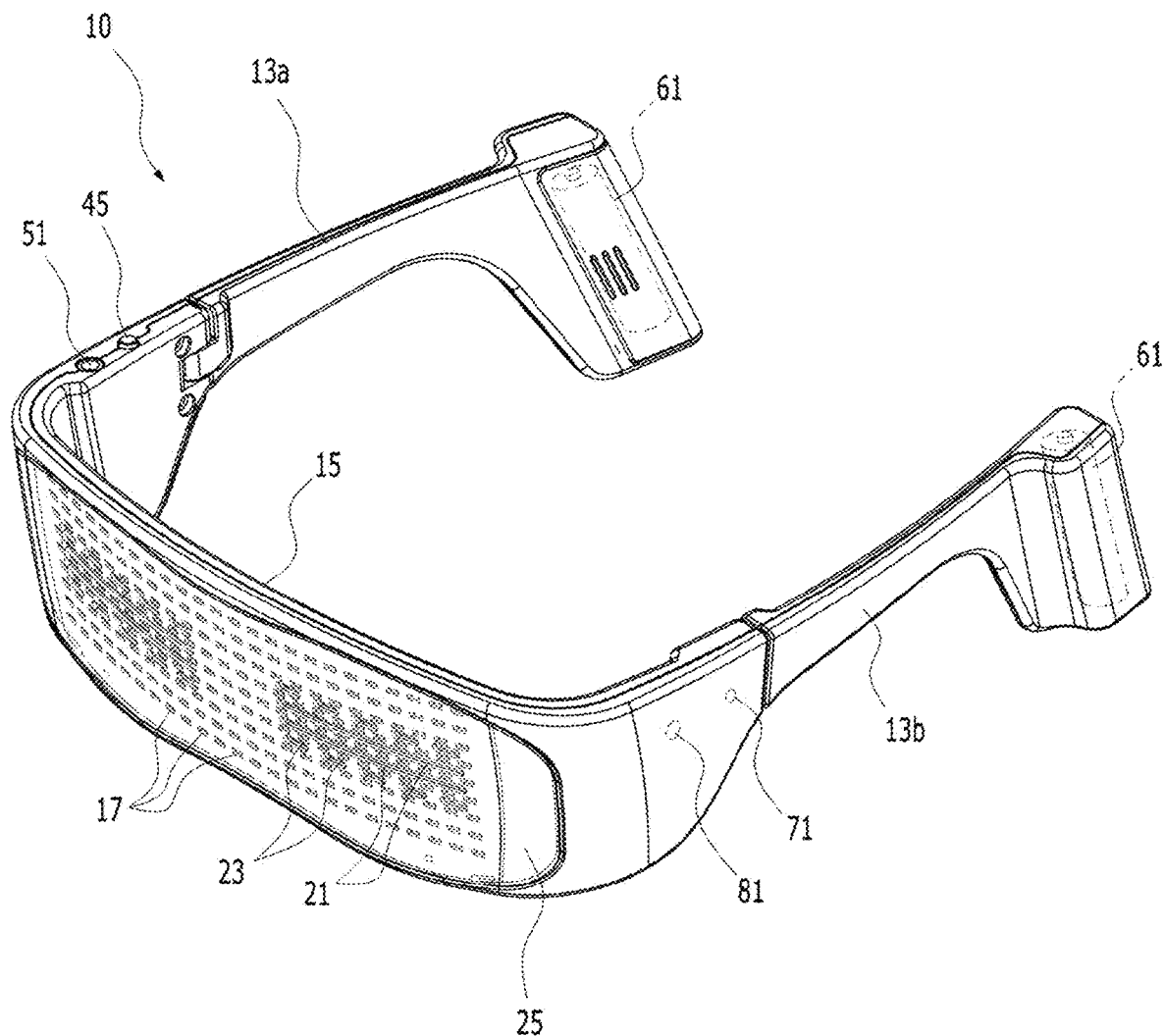
FIG. 1 is a perspective view of a pair of light emitting diode eyeglasses according to the inventive concept.
Figure 2:
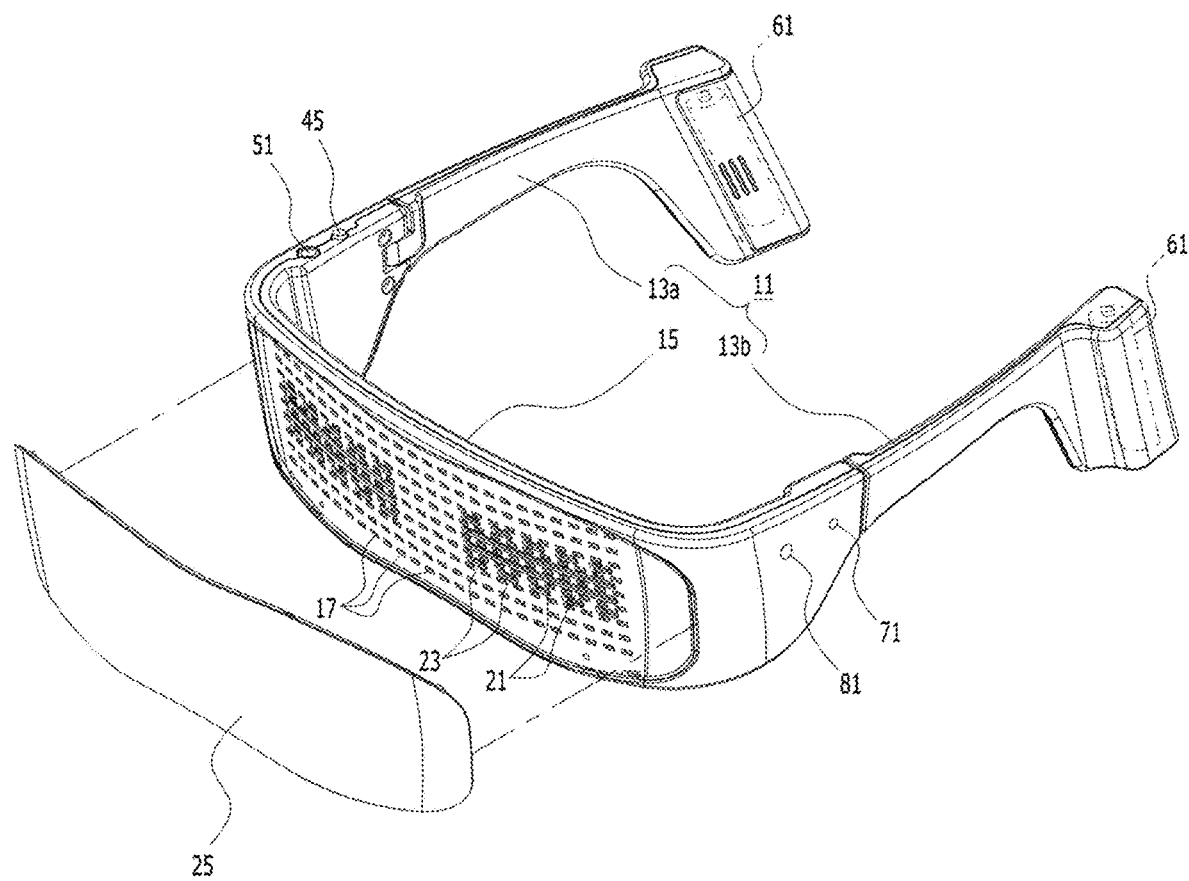
FIG. 2 is a partially exploded perspective view of FIG. 1.
Figure 3:
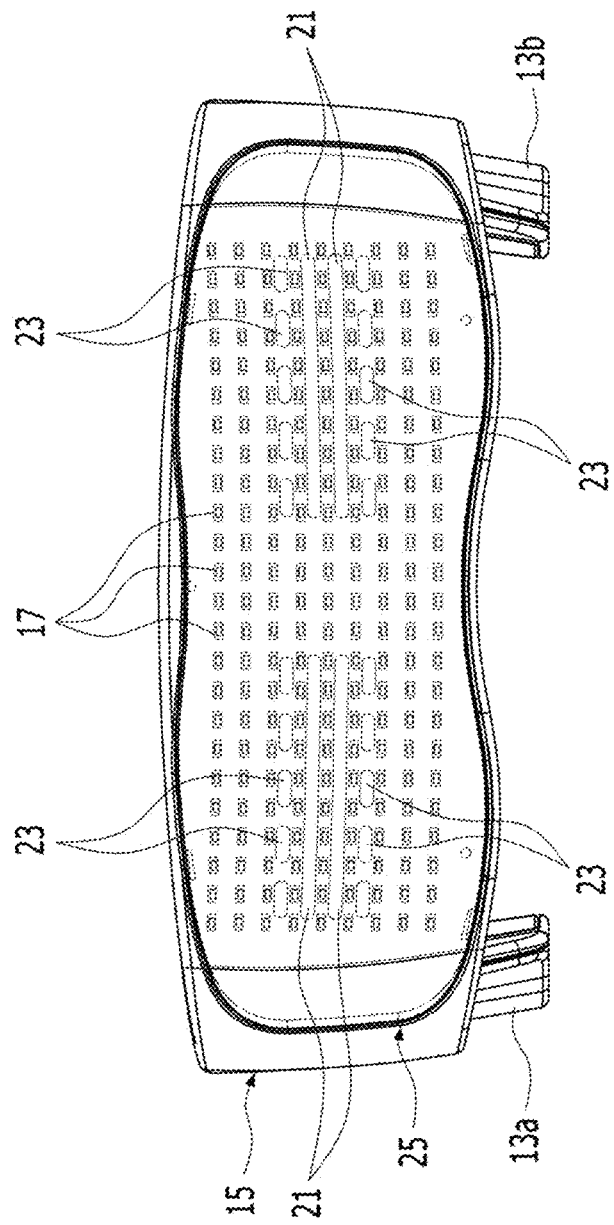
FIG. 3 is a front view of FIG. 1.
Figure 4:
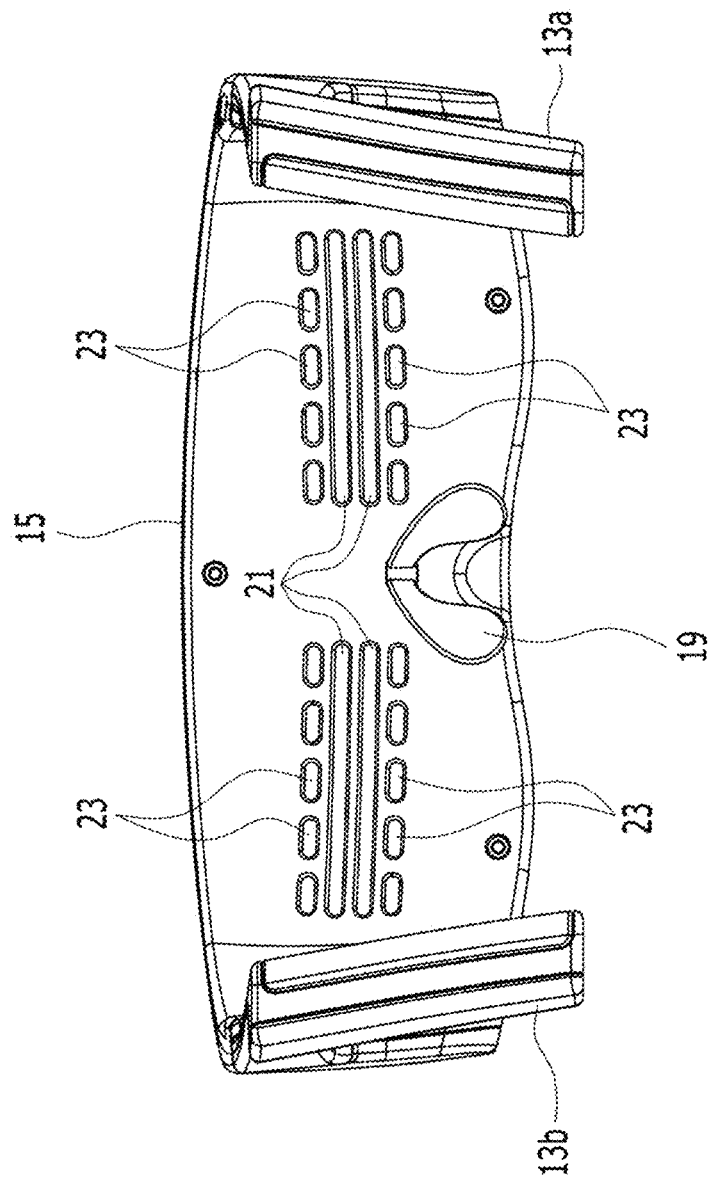
FIG. 4 is a rear view of FIG. 1.
Figure 5:
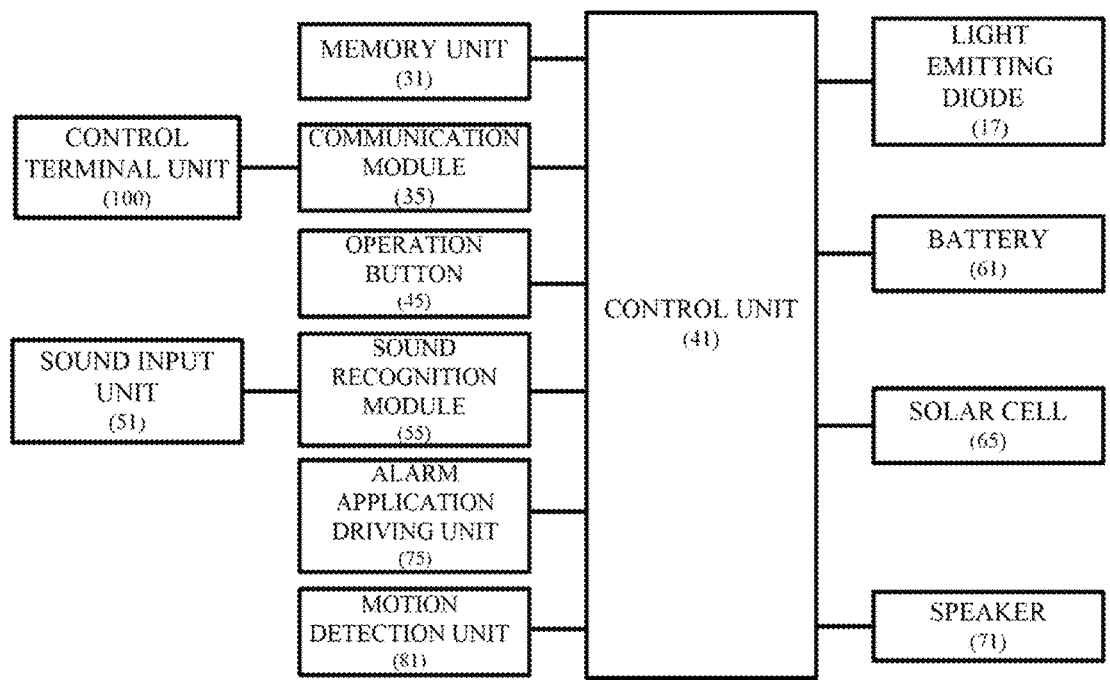
FIG. 5 is a control block diagram of the pair of light emitting diode eyeglasses according to the inventive concept.

Hereinafter, exemplary embodiments of the inventive concept will be described in detail with reference to the accompanying drawings. The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements.

FIGS. 1 to 5 illustrate a pair of light emitting diode eyeglasses according to the inventive concept. As illustrated in the drawings, the pair of light emitting diode eyeglasses 10 according to the inventive concept includes an eyeglass frame 11, a memory unit 31, a communication module 35, and a control unit 41.

The eyeglass frame 11 includes a pair of leg frames 13*a* and 13*b* and a front frame 15.

The pair of leg frames 13*a* and 13*b* are spaced apart from each other, ends of the leg frames 13*a* and 13*b* are connected to each other by the front frame 15 and hinges (not illustrated) to be foldable, opposite ends of the leg frames 13*a* and 13*b* are partially bent to be mounted on the ears of a user.

The front frame 15 is connected to the ends of the pair of leg frames 13*a* and 13*b*, and is arranged on the front side of the eyes of the user. Nose pads 19 for positioning the pair of light emitting diode eyeglasses 10 according to the inventive concept on the bridge of the nose of the user are provided on a plate surface of the front frame 15 situated on a side that is close to of the eyes of the user, and a plurality of light emitting diode 17 may be arranged at an interval on a plate surface of the front frame 15 situated on a side that is opposite to the eyes of the user. A circuit board (not illustrated) for driving the plurality of light emitting diode 17 is embedded in the front frame 15.

Further, a plurality of openings for securing the front field of view of the user is provided in the front frame 15. In the embodiment, as some of the openings, a pair of first rectangular slots 21 are arranged in parallel along the lengthwise direction of the front frame 15 at each of the centers of the opposite sides of the front frame 15, at which the two eyes of the user are situated, and the pair of first slots 21 have a length that corresponds to a range by which the eyes of the user may recognize the left and right sides of the eyes. As the other openings, a plurality of second rectangular slots 23 having a length that is smaller than that of the first slots 21 are arranged at an interval along the lengthwise direction of the front frame 15 on the outer side of the pair of first slots 21.

Meanwhile, a cover glass 25 is arranged on the front side of the front frame 15, and the cover glass 25 functions to cover the plurality of light emitting diode 17. The cover glass 25 may be formed of a transparent or translucent synthetic resin or glass. The cover glass 25 has a streamlined shape, and is coupled to a front side of the eyeglass frame 11 to close and cover a front surface of the front frame 15. Although it is illustrated in the embodiment that the cover glass 25 is coupled to the eyeglass frame 11 while closing the front surface of the front frame 15, but the inventive concept is not limited thereto, and the cover glass 25 may be coupled to the eyeglass frame 11 while being spaced apart from an area of the front frame 15 such that heat generated by the plurality of light emitting diode 17 is smoothly discharged to the outside.

The memory unit 31 is provided in the eyeglass frame 11 to store one or more first pattern data. In the following description, pattern data will refer to various patterns such as texts, images, numbers, special symbols, and the like. The first pattern data are manufactured and edited by the user by using a terminal device, such as a computer. The memory unit 31 may be embedded in the eyeglass frame 11 or may be attached to the eyeglass frame 11, for example, in the form of an SD card. Further, the memory unit 31 may store one or more second pattern data that are provided from an external control terminal unit 100.

The communication module 35 is provided in the eyeglass frame 11, and functions to synchronize the control terminal unit 100 and the pair of light emitting diode eyeglasses 10 according to the inventive concept such that the control terminal unit 100 and the pair of light emitting diode eyeglasses 10 may perform data communication with each other, and to provide the one or more second pattern data provided by the control terminal unit 100 to the pair of light emitting diode eyeglasses 10 in real time.

Here, the control terminal unit 100 functions to control an on/off state, an output content, or an output time of the pair of light emitting diode eyeglasses 10, and may be software such as a control program as well as hardware such as a smartphone, a PC, or a tablet PC.

The control unit 41 is provided in the eyeglass frame 11, and controls driving of the light emitting diode 17 such that the first pattern data stored in the memory unit 31 or the second pattern data provided through the communication module 35 are displayed through the light emitting diode 17.

Here, the memory unit 31, the communication module 35, and the control unit 41 may be selectively provided in the front frame 15 or the leg frames 13a and 13b of the eyeglass frame 11.

Further, the pair of light emitting diode eyeglasses 10 according to the inventive concept includes a operation button 45 for controlling driving of the light emitting diode 17. The operation button 45 is provided at one end of the front frame 15 of the eyeglass frame 11, and the control unit 41 controls driving of the light emitting diode 17 such that the first pattern data stored in the memory unit 31 are selected and are displayed through the light emitting diode 17 based on the manipulation of the operation button 45. For example, the user may display the desired first pattern data to a counterpart through the plurality of light emitting diode 17 by pressing the operation button 45. Here, although it is illustrated in the embodiment that the operation button 45 is provided in the front frame 15, the inventive concept is not limited thereto, and the operation button 45 may be provided in one of the leg frames 13a and 13b.

Meanwhile, when the control unit 41 communicates with the control terminal unit 100 through the communication module 35, the control unit 41 is not controlled by the operation button 45 and controls driving of the light emitting diode 17 such that the second pattern data received by the control terminal unit 100 are displayed through the light emitting diode 17.

Further, the pair of light emitting diode eyeglasses 10 according to the inventive concept further includes a sound input unit 51 and a sound recognition module 55.

The sound input unit 51 is provided to input a sound, includes at least one of a sound input port and a microphone, and is provided in the eyeglass frame 11. Although a sound input port is provided at one end of the front frame 15 of the eyeglass frame 11 as the sound input unit 51 in the embodiment, the inventive concept is not limited thereto and the sound input port may be provided in the leg frames 13a and 13b. Further, only a microphone or both a sound input port and a microphone may be provided as the sound input unit 51.

The sound recognition module 55 is provided in the eyeglass frame 11 and recognizes a sound input through the sound input unit 51.

Accordingly, if a sound is input through the sound input unit 51, the control unit 41 controls driving of the light emitting diode 17 such that the first pattern data stored in the memory unit 31 are displayed through the light emitting diode 17, based on sound data recognized by the sound recognition module 55.

Here, the first pattern data displayed through the light emitting diode 17 based on the sound data recognized by the sound recognition module 55 may have a form of an equalizer. In this case, as an example, if music is input through the sound input unit 51, the control unit 41 may perform a control such that the sound data recognized by the sound recognition module 55 are displayed through the light emitting diode 17 in a form of an equalizer in response to a sense of rhythm to show a dynamic and elated atmosphere to a counterpart.

Further, the pair of light emitting diode eyeglasses 10 according to the inventive concept includes battery 61 that function as a power supply unit for supplying electric power to the plurality of light emitting diode 17, the memory unit 31, the communication unit 35, and the control unit 41. The battery 61 may be received in free ends of the leg frames 13a and 13b that are positioned on the ears of the user. In this way, as the battery 61 are received in the free ends of the leg frames 13a and 13b, the center of weight of the pair of light emitting diode eyeglasses 10 may be prevented from being declined towards the front frame 15, so that the feeling of wearing of the eyeglasses may be improved by reducing loads that are concentrated on the ears of the user when the user wears the eyeglasses. Here, the battery 61 may have a form of a general battery or a button, and general mercury batteries or rechargeable lithium polymer chargers may be used as the battery 61. Further, although it has been described in the embodiment that the battery 61 are provided at the free ends of the leg frames 13a and 13b, the inventive concept is not limited thereto and the battery 61 may be provided in other areas of the leg frames 13a and 13b or the front frame 15.

Further, the pair of light emitting diode eyeglasses 10 according to the inventive concept further includes a solar cell 65 that converts light energy to electrical energy. Although not illustrated, the solar cell 65 is provided in the eyeglass frame 11, and the electrical energy generated by the solar cell 65 is provided to the battery 61 to extend the life span of the battery 61.

Further, the pair of light emitting diode eyeglasses 10 according to the inventive concept further includes a speaker 71 that is provided at an opposite end of the front frame 15 of the eyeglass frame 11 to output a sound. Although it is illustrated in the embodiment that the speaker 71 is provided in the front frame 15 of the eyeglass frame 11, the inventive concept is not limited thereto, and the speaker 71 may be provided in one of the leg frames 13a and 13b.

Meanwhile, the pair of light emitting diode eyeglasses 10 according to the inventive concept includes an alarm application driving unit 75 that interworks with the control terminal unit 100. The control unit 41 performs a control such that an alarm is output through the speaker 71 based on an alarm time set in the alarm application driving unit 75. Here, music is input through the sound input unit 51, the control unit 41 may perform a control such that the input music is output through the speaker 71.

Further, the pair of light emitting diode eyeglasses 10 according to the inventive concept includes a motion detection unit 81 that detects a motion of the eyeglass frame 11. The motion detection unit 81 is a gyro sensor or an acceleration sensor, and is arranged at an opposite end of the front frame 15 of the eyeglass frame 11. Accordingly, if the user moves his or her head upwards and downwards while wearing the pair of light emitting diode eyeglasses 10, the control unit 41 displays a text of 'YES' through the light emitting diode 17 as an example of the first pattern data stored in the memory unit 31, based on a signal generated by the motion detection unit 81. Further, if the user moves his or her head leftwards and rightwards, the control unit 41 displays a text of 'NO' through the light emitting diode 17 as the first pattern data stored in the memory unit 31, based on a signal generated by the motion detection unit 81. In this way, the pair of light emitting diode eyeglasses 10 according to the inventive concept may display various pattern data by using the motion detection unit 81. Here, although it is illustrated in the embodiment that the motion detection unit 81 is provided in the front frame 15 of the eyeglass frame 11, the inventive concept is not limited thereto, and the motion detection unit 81 may be provided in one of the leg frames 13a and 13b.

Meanwhile, the plurality of light emitting diode 17 applied to the pair of light emitting diode eyeglasses 10 of the inventive concept may emit light of different colors as another embodiment, and the control unit 41 controls driving of the light emitting diode 17 such that the first pattern data stored in the memory unit 31 or the second pattern data provided through the communication module 35 are displayed through the light emitting diode 17 while the light emitting diode 17 emit light of different colors.

Figure 6:
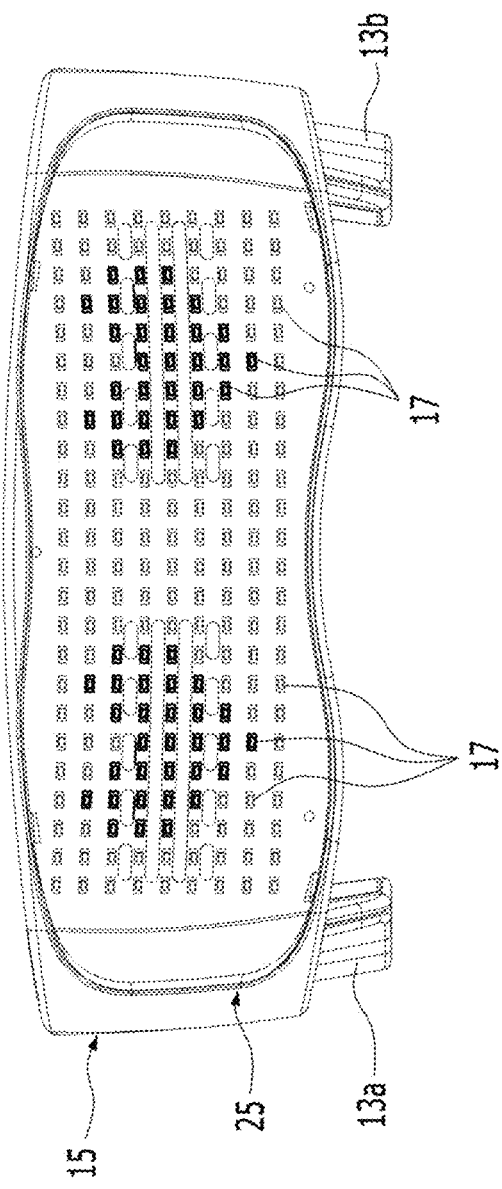
FIG. 6 is a view illustrating a state in which a pattern is displayed on the pair of light emitting diode eyeglasses according to an embodiment of the inventive concept.

FIG. 6 illustrates that a heart-shaped pattern is displayed on the pair of light emitting diode eyeglasses 10 according to the inventive concept, as an embodiment.

With the configuration, a process of using the pair of light emitting diode eyeglasses 10 according to the inventive concept will be described as follows.

If the user presses the operation button 45 at an initial stage while wearing the pair of light emitting diode eyeglasses 10 according to the inventive concept, electric power is provided from the battery 61 to the light emitting diode 17 and any one of the plurality of first pattern data stored in the memory unit 31 is displayed through the light emitting diode 17 to the counterpart.

Further, as the operation button 45 is pressed, the plurality of first pattern data stored in the memory unit 31 are sequentially displayed through the light emitting diode 17 based on a specific sequence.

Meanwhile, when the control unit 41 communicates with the control terminal unit 100 through the communication module 35, the second pattern data received from the control terminal unit 100 are displayed through the light emitting diode 17 under the control of the control unit 41.

Accordingly, pattern data stored in advance may be shown and new pattern data may be conveniently shown on the spot through real-time communication. Further, various forms such as a mass game may be shown by transmitting the same pattern data or sequential pattern data to a plurality of eyeglass wearers within a communication range from the control terminal unit 100 simultaneously or with a time interval in real-time communication and displaying the pattern data through the light emitting diode 17 of the plurality of pairs of light emitting diode eyeglasses 10.

Accordingly, if a sound is input through the sound input unit 51, the first pattern data stored in the memory unit 31 are displayed through the light emitting diode 17 stored in the memory unit 31, based on sound data recognized by the sound recognition module 55.

Further, as an alarm time is set in the alarm application driving unit 75, an alarm is output through the speaker 71 based on the alarm time set in the alarm application driving unit 75.

Further, the first pattern data stored in the memory unit 31 may be displayed through the light emitting diode 17 based on a motion of the user as the motion detection unit 81 detects the motion.

Hereinafter, a system for controlling a plurality of pairs of light emitting diode eyeglasses at the same time will be described.

Figure 7:
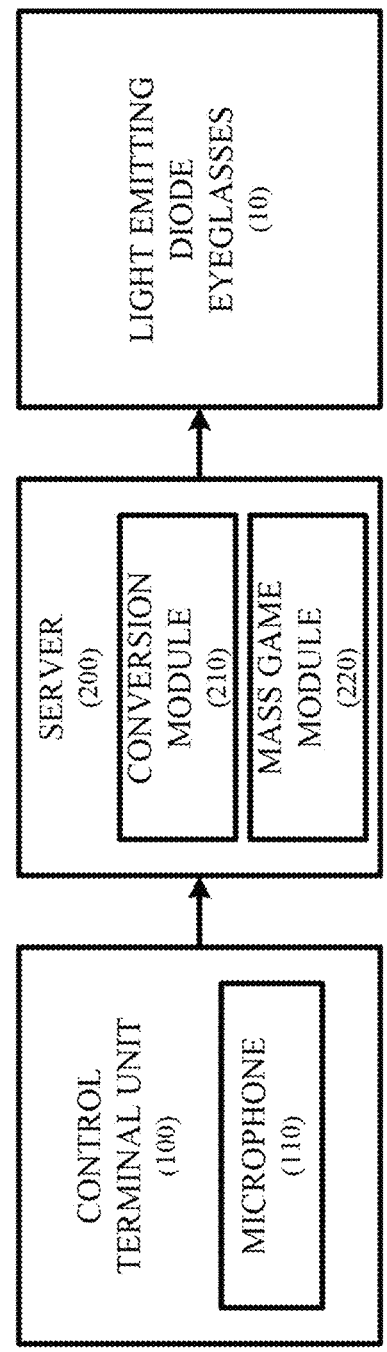
FIG. 7 is a diagram of a control system that controls a plurality of pairs of light emitting diode eyeglasses at the same time.

FIG. 7 illustrates a diagram of a control system that controls a plurality of pairs of light emitting diode eyeglasses at the same time.

The system for controlling a plurality of pairs of light emitting diode eyeglasses according to the inventive concept includes a plurality of pairs of light emitting diode eyeglasses 10 that output pattern data, a control terminal unit 100 that controls the light emitting diode eyeglasses 10, and a server 200 that transmits pattern data to the plurality of pairs of light emitting diode eyeglasses 10.

Further, the control terminal unit 100 may include a microphone 110, and the server 200 may include a conversion module 210 that analyzes a sound detected by the microphone 110 to convert a specific waveform (for example, an equalizer image) or a text to the pattern data. Here, the control terminal unit 100 functions to control an on/off state, an output content, or an output time of the pair of light emitting diode eyeglasses 10, and may be software such as a control program as well as hardware such as a smartphone, a PC, or a tablet PC.

Further, the server 200 may further include a mass game module 220 that receives arrangement information of the plurality of pairs of light emitting diode eyeglasses 10, generates pattern data based on the arrangement information, and controls overall operations of the plurality of pairs of light emitting diode eyeglasses 10.

A method of controlling a plurality of pairs of light emitting diode eyeglasses by the control system will be described as follows.

Figure 8:
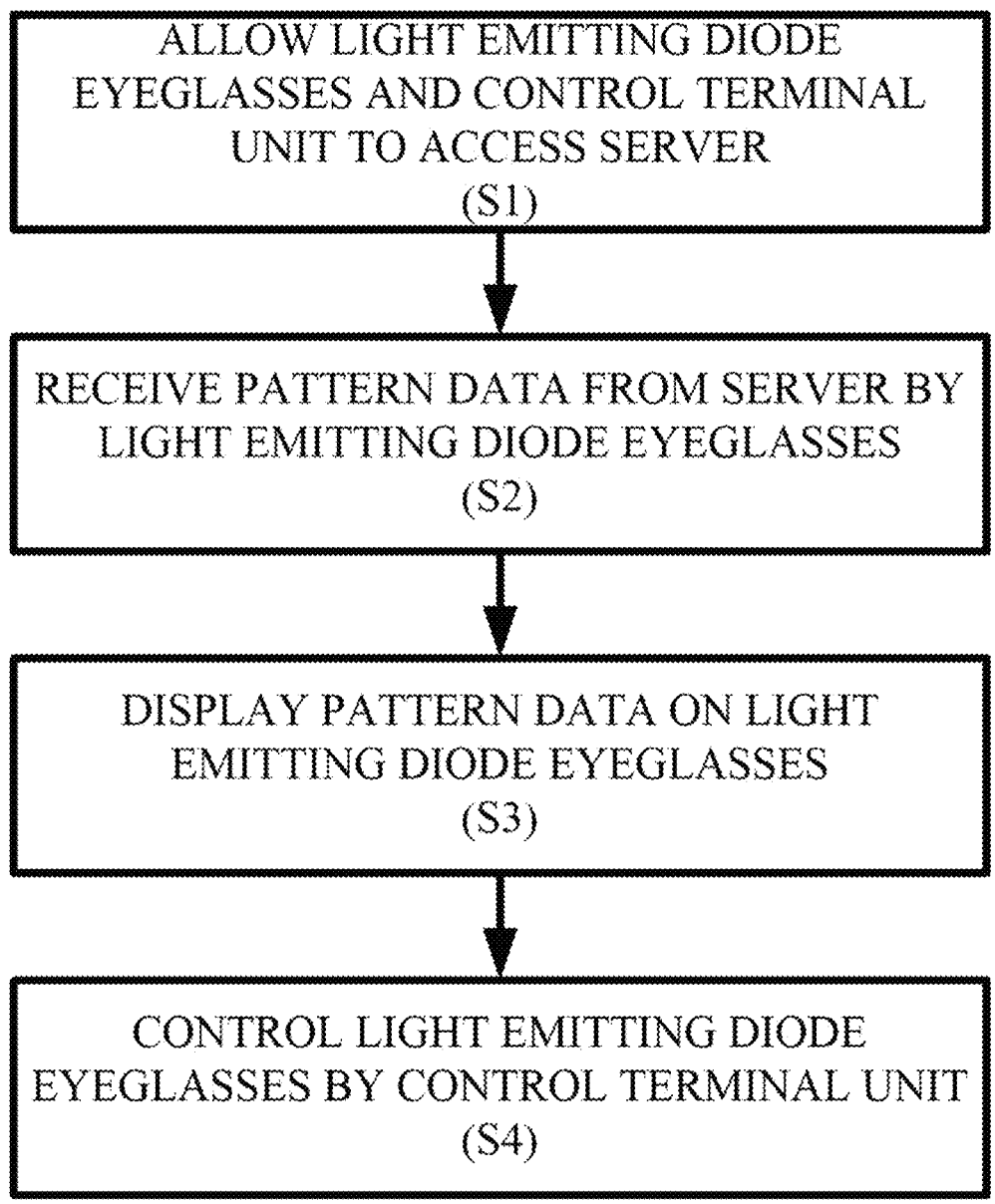
FIG. 8 is a view illustrating an embodiment of a method of controlling a plurality of pairs of light emitting diode eyeglasses.

FIG. 8 illustrates the method of controlling a plurality of pairs of light emitting diode eyeglasses according to an embodiment of the inventive concept. The method of controlling a plurality of pairs of light emitting diode eyeglasses according to the present embodiment includes a step of allowing the plurality of pairs of light emitting diode eyeglasses 10 and the control terminal unit 100 to access the server 200, a step of receiving pattern data from the server 200, by the plurality of pairs of light emitting diode eyeglasses 10, and a step of displaying the pattern data on the plurality of pairs of light emitting diode eyeglasses 10.

Figure 11:
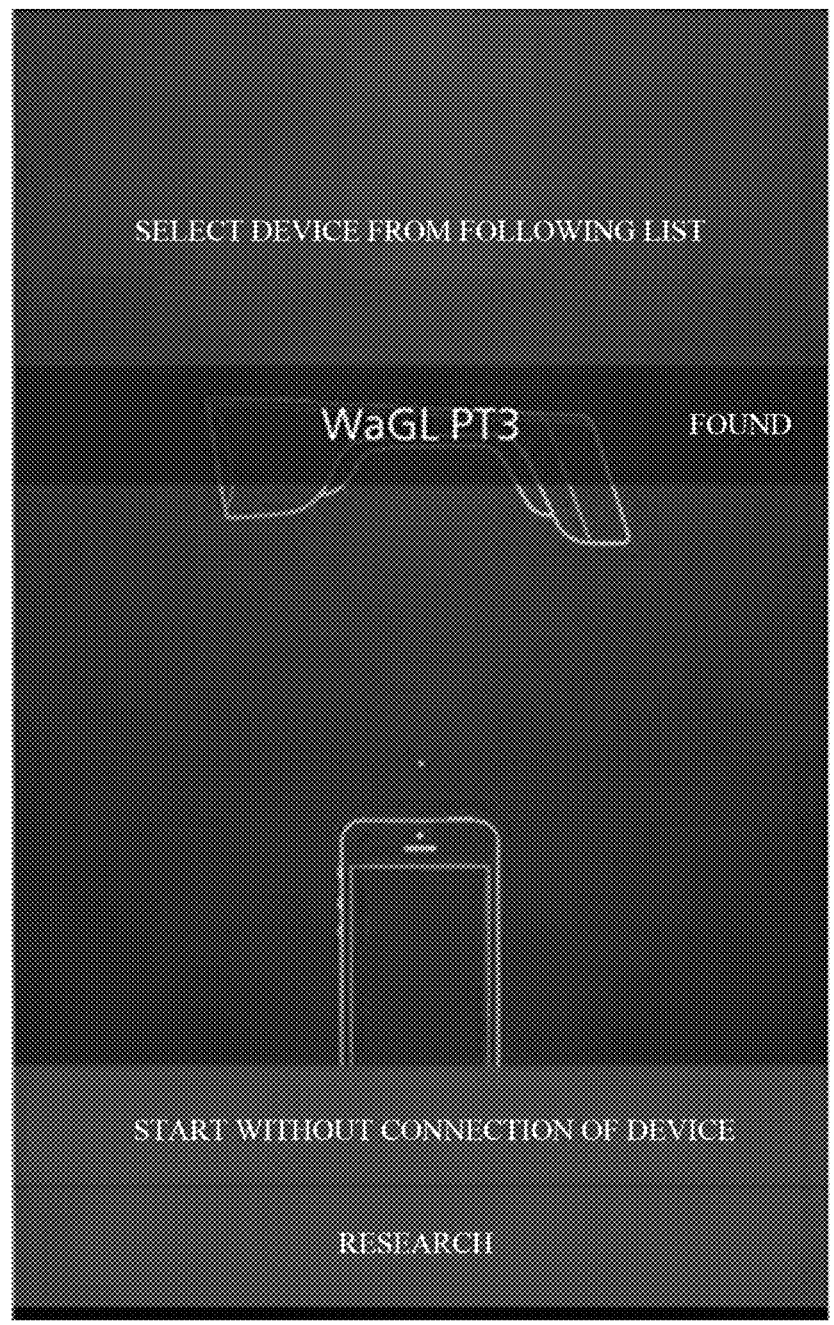
FIG. 11 is a view illustrating interworking of a communication module and a pair of light emitting diode eyeglasses.

First, the plurality of pairs of light emitting diode eyeglasses 10 and the control terminal unit 100 access the server 200 (S1). For example, as illustrated in FIGS. 11 to 16, as a program for controlling the plurality of pairs of light emitting diode eyeglasses 10 is installed in the control terminal unit 100, the control terminal unit 100 may access the server 200 through the program and the plurality of pairs of light emitting diode eyeglasses 10 may access the server 200 through interworking with the control terminal unit 100 as illustrated in FIG. 11. Further, as another embodiment, each of the plurality of pairs of light emitting diode eyeglasses 10 may include a communication module 35, and may access the server 200 through the communication module 35. This corresponds to an embodiment in which the carrier of the control terminal unit 100 and the wearer of the pair of light emitting diode eyeglasses 10 are different. That is, person A may control the plurality of pairs of light emitting diode eyeglasses 10 that are carried by persons B, C, and D through the control terminal unit 100. Then, the pair of light emitting diode eyeglasses 10 of person A may access to the server 200 through the program installed in the control terminal unit 100 of person A, and the plurality of pairs of light emitting diode eyeglasses 10 of persons B, C, and D may access to the server 200 through the communication module 35 of the plurality of pairs of light emitting diode eyeglasses 10 of persons B, C, and D. Then, the communication module 35 may be integrated with the pair of light emitting diode eyeglasses 10, or may be mechanically separated from the pair of light emitting diode eyeglasses 10 to access the pair of light emitting diode eyeglasses 10 through interworking.

After the plurality of pairs of light emitting diode eyeglasses 10 and the control terminal unit 100 access the server 200, the plurality of pairs of light emitting diode eyeglasses 10 receive pattern data from the server 200. The pattern data may generally refer to all visual information that will be output on the plurality of pairs of light emitting diode eyeglasses 10, and may include a text, an image, a picture, a figure, and an equalizer image.

Figure 12:
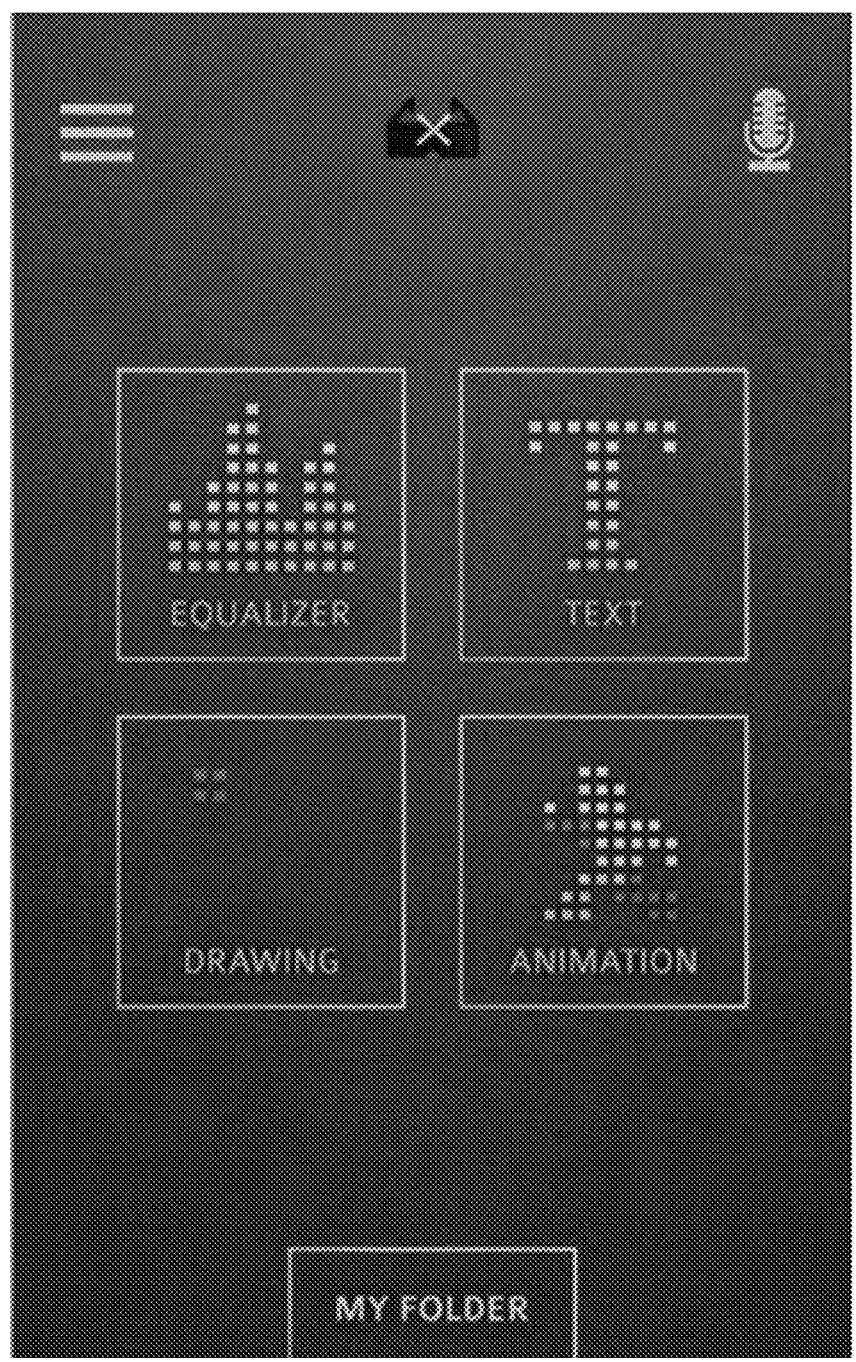
FIG. 12 is a screen for selecting a type of pattern data by a control terminal.
Figure 13:
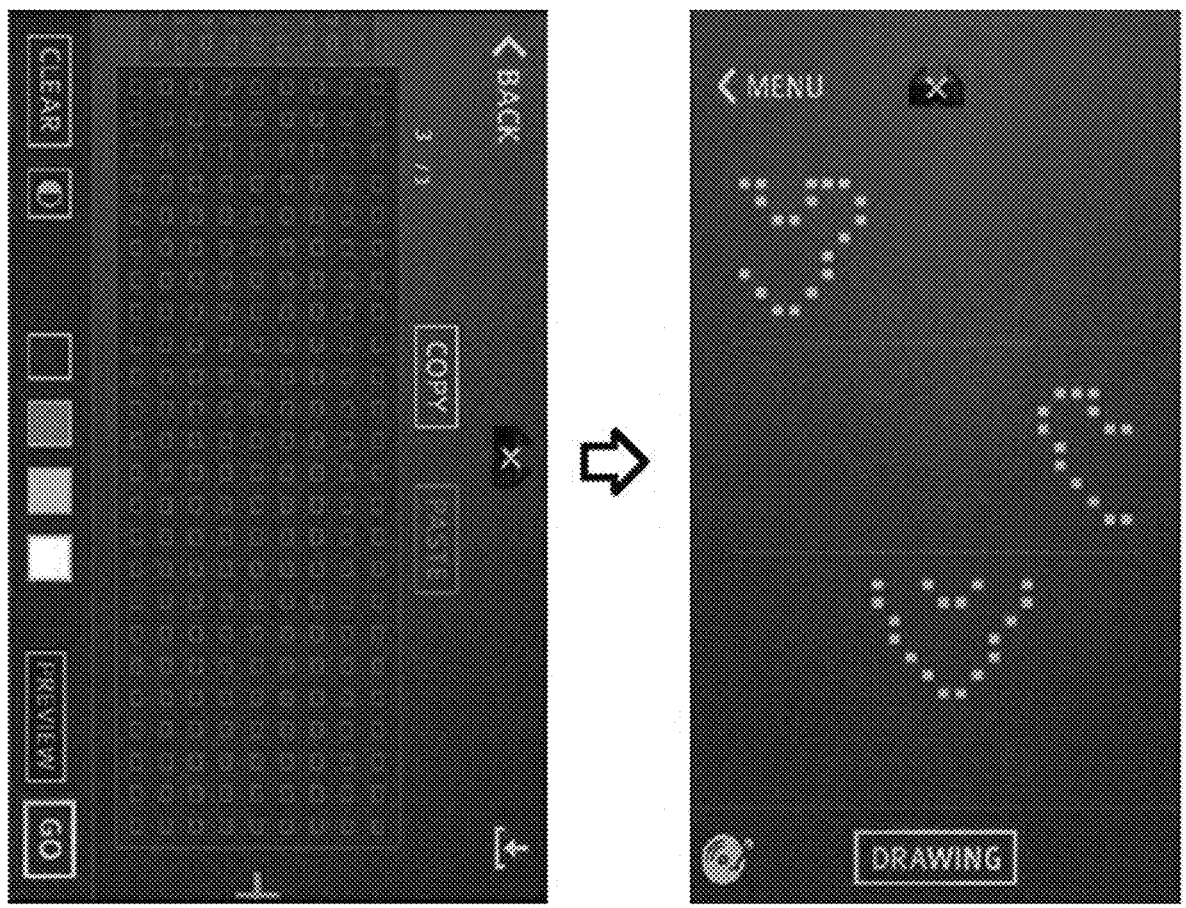
FIG. 13 is a screen for producing figure type pattern data.
Figure 14:
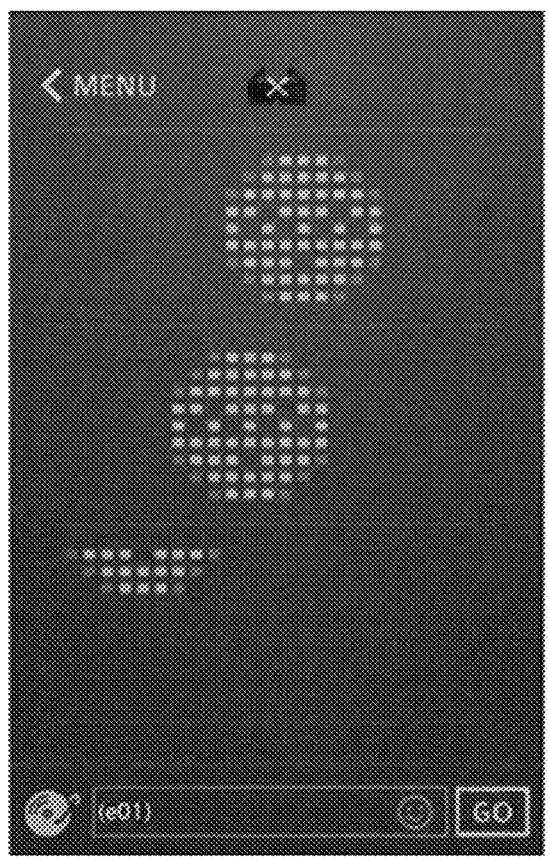
FIG. 14 is a screen for producing picture type pattern data.
Figure 14:
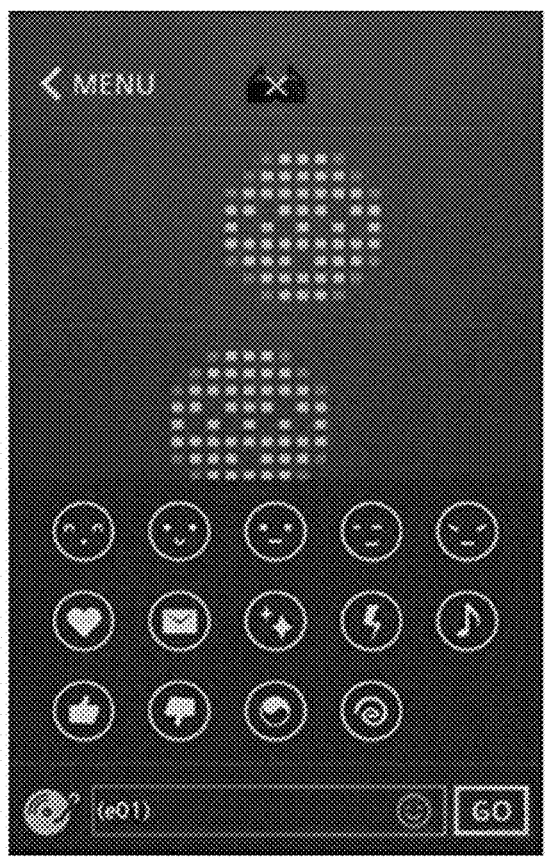
Figure 15:
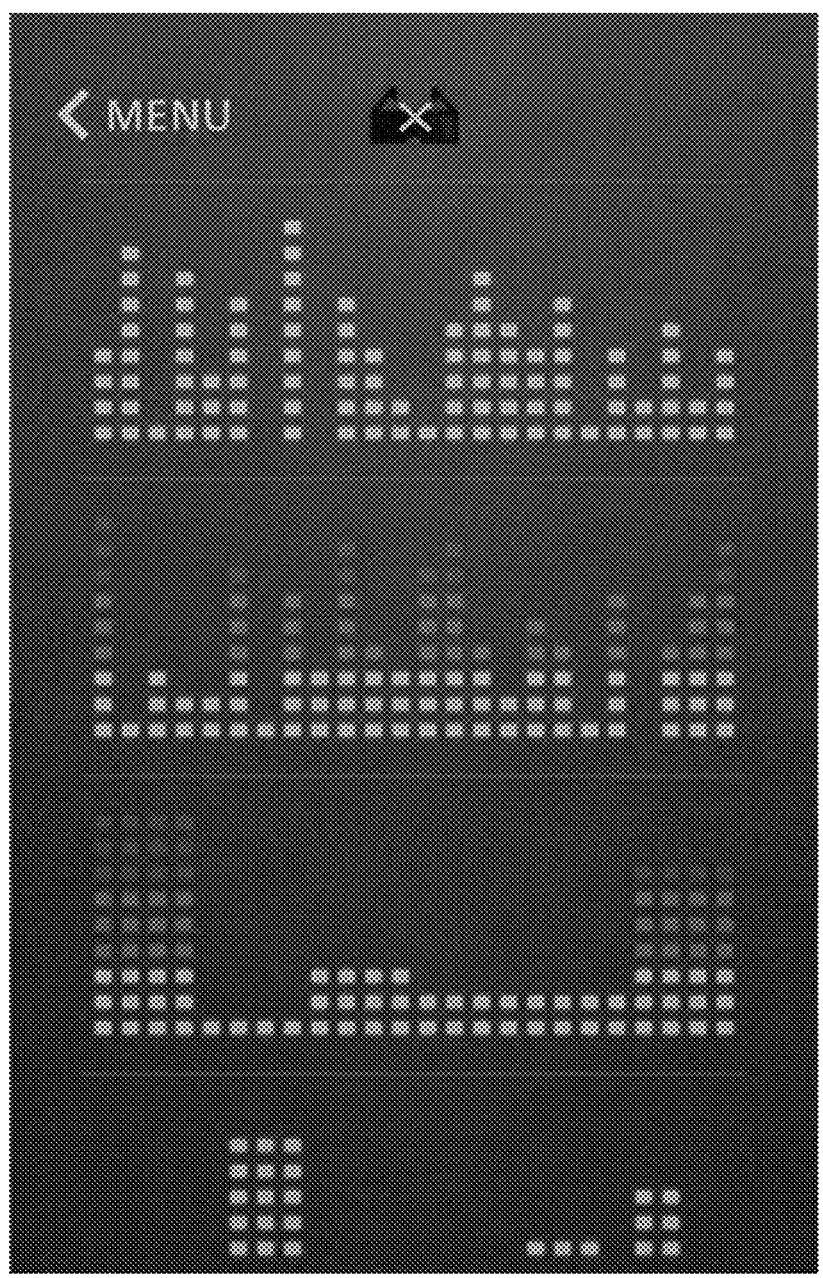
FIG. 15 is a screen for producing equalizer image type pattern data.
Figure 16:
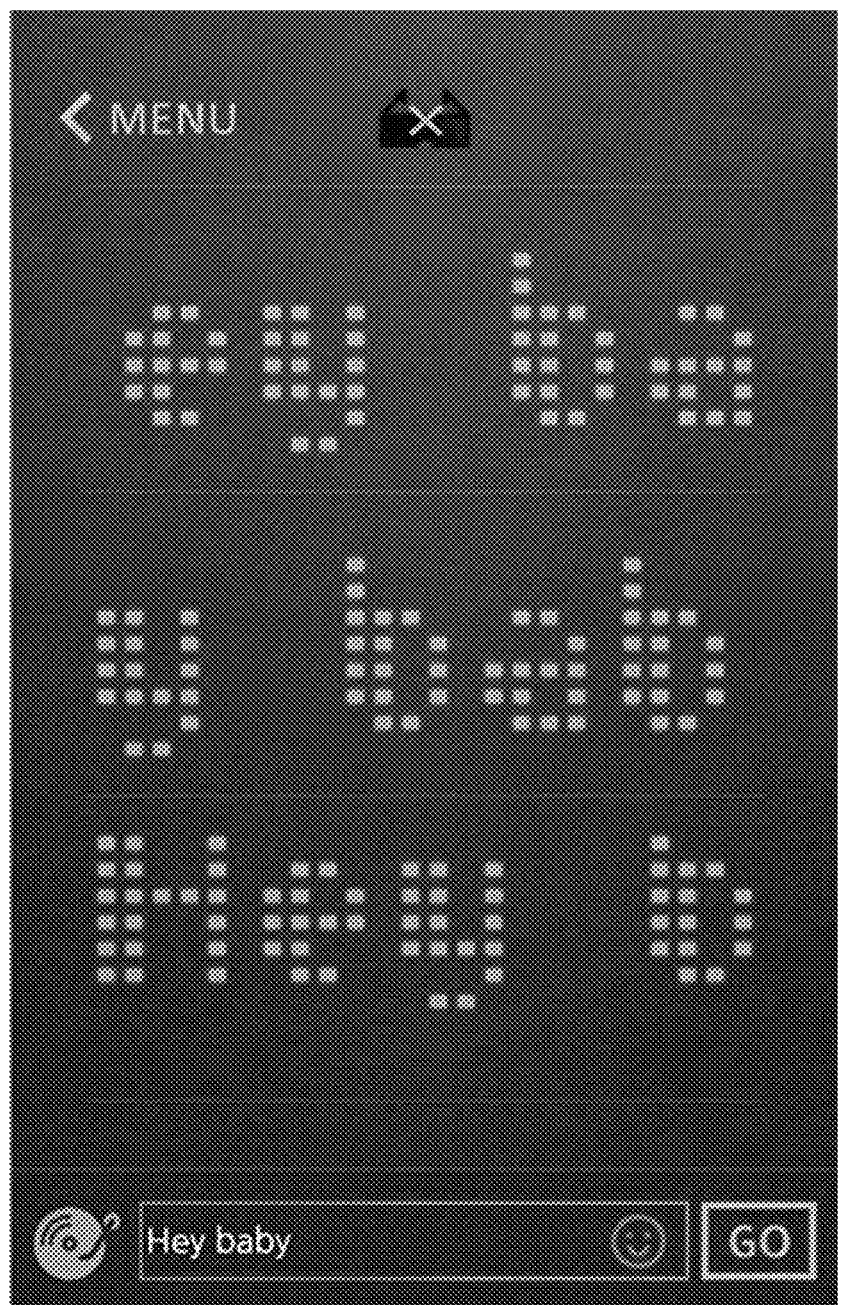
FIG. 16 is a screen for producing text type pattern data.

In an embodiment, as illustrated in FIGS. 12 to 15, the pattern data may be produced by the control terminal unit 100. The pattern data may be produced based on a text or a sound that is input by the control terminal unit 100. A program for producing pattern data may be installed in the control terminal unit 100, and the pattern data may be produced and transmitted through the program. As illustrated in FIG. 12, the type of pattern data (an equalizer image, a text, a drawing, or a picture) may be determined. As illustrated in FIG. 13, the pattern data may be produced in a direct drawing manner, and as illustrated in FIG. 14, the pattern data may be produced by selecting a picture that is stored. Further, as illustrated in FIG. 15, the pattern data may be produced in a form of an equalizer image, and as illustrated in FIG. 16, the pattern data may be produced by inputting a text through a keyboard. In addition, pattern data of a text or a picture may be produced by recognizing a sound. That is, if a director shouts "Elephant" to the microphone 110 of the control terminal unit 100, pattern data of an image of an elephant or pattern data of a text of "Elephant" may be produced in response.

Figure 10:
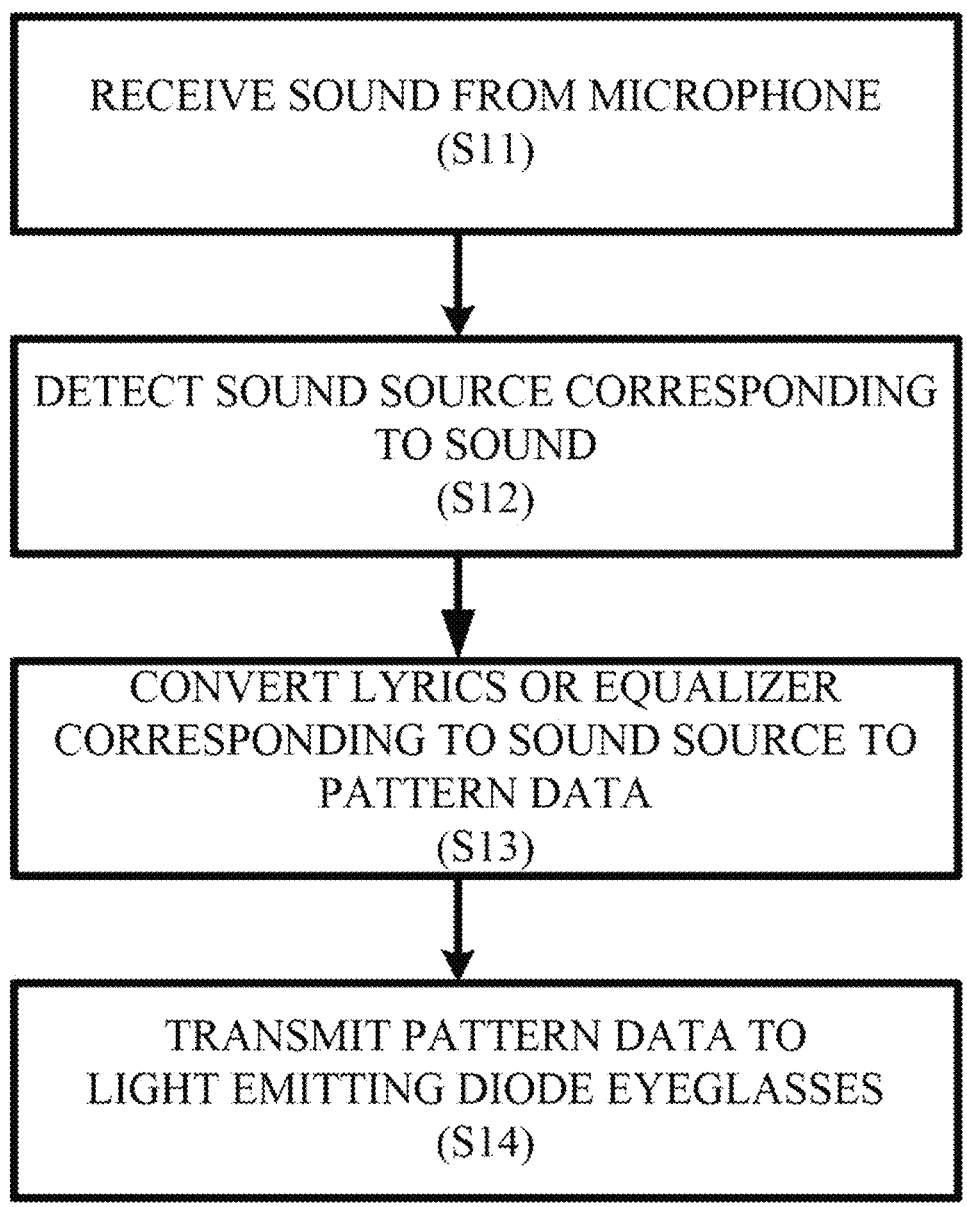
FIG. 10 is a view illustrating an embodiment of using pattern data for lyrics or an equalizer image of a sound source.

In an embodiment, as illustrated in FIG. 10, the lyrics or an equalizer image of a sound source may be produced as pattern data. First, if a sound is received by the microphone 110 of the control terminal unit 100 (S11), the sound is transmitted to the server 200 and the server 200 detects a sound source corresponding to the sound (S12). Then, an existing sound source database, such as, Naver Music, Melon, or Bugs Music, may be used to detect the sound source, and the server 200 may detect the sound source through a sound analysis program and a database of the server 200. Thereafter, the conversion module 210 of the server 200, may convert lyrics or an equalizer image corresponding to the sound source to pattern data (S13), and may transmit the pattern data to the plurality of pairs of light emitting diode eyeglasses 10 (S14). Here, the sound may generally refer to all sounds such as a voice of a person, a sound from a synthesizer, a sound from a guitar, a drum sound, and a sound of hand clapping.

In an embodiment, the plurality of pairs of light emitting diode eyeglasses may receive the sound. That is, although it has been described in the previous embodiment that the microphone 110 of the control terminal unit 100 receives a sound, the sound may be directly received through the sound input units 51 of the plurality of pairs of light emitting diode eyeglasses 10. Then, the sound received by the plurality of pairs of light emitting diode eyeglasses 10 is transmitted to the server 200, and after the server 200 detects the sound source corresponding to the above-described embodiment, the conversion module 210 converts lyrics and an equalizer image for the sound source to pattern data.

The generated or converted and transmitted pattern data are displayed on the plurality of pairs of light emitting diode eyeglasses 10 (S3). Then, the control terminal unit 100 may participate in the operations of the plurality of pairs of light emitting diode eyeglasses 10 (S4). That is, the plurality of pairs of light emitting diode eyeglasses 10 are operated in response to an operation signal received from the control terminal unit 100. For example, in order to collectively operate and stop the plurality of pairs of light emitting diode eyeglasses 10, the control terminal unit 100 may transmit an operation signal to the plurality of pairs of light emitting diode eyeglasses 10. That is, the plurality of pairs of light emitting diode eyeglasses 10 may output pattern data if the user presses an "ON" button in the control terminal unit 100, the plurality of pairs of light emitting diode eyeglasses 10 may stop outputting pattern data if the user presses an "OFF" button in the control terminal unit 100, and pattern data may flicker at a specific time interval if the user presses an "Flickering" button in the control terminal unit 100.

In another embodiment, the server 200 may participate in the operations of the plurality of pairs of light emitting diode eyeglasses 10. For example, the server 200 transmits timestamp information on pattern data to the communication modules 35 of the plurality of pairs of light emitting diode eyeglasses 10, and the plurality of pairs of light emitting diode eyeglasses 10 may be operated based on the timestamp information. In this case, because the timestamp information depends on the clocks of the plurality of pairs of light emitting diode eyeglasses 10 once it is transmitted to the plurality of pairs of light emitting diode eyeglasses 10, the plurality of pairs of light emitting diode eyeglasses 10 may be operated even through the links between the plurality of pairs of light emitting diode eyeglasses 10 and the server 200 are disconnected after the timestamp information is transmitted. Further, the timestamp information may depend on an external absolute time such as a satellite time. For example, the pattern data may be output at 7 p.m. sharp, may flicker five times at a time interval of 1 second at 7:02 p.m., and the output of the pattern data may be stopped at 7:05 p.m.

Figure 9:
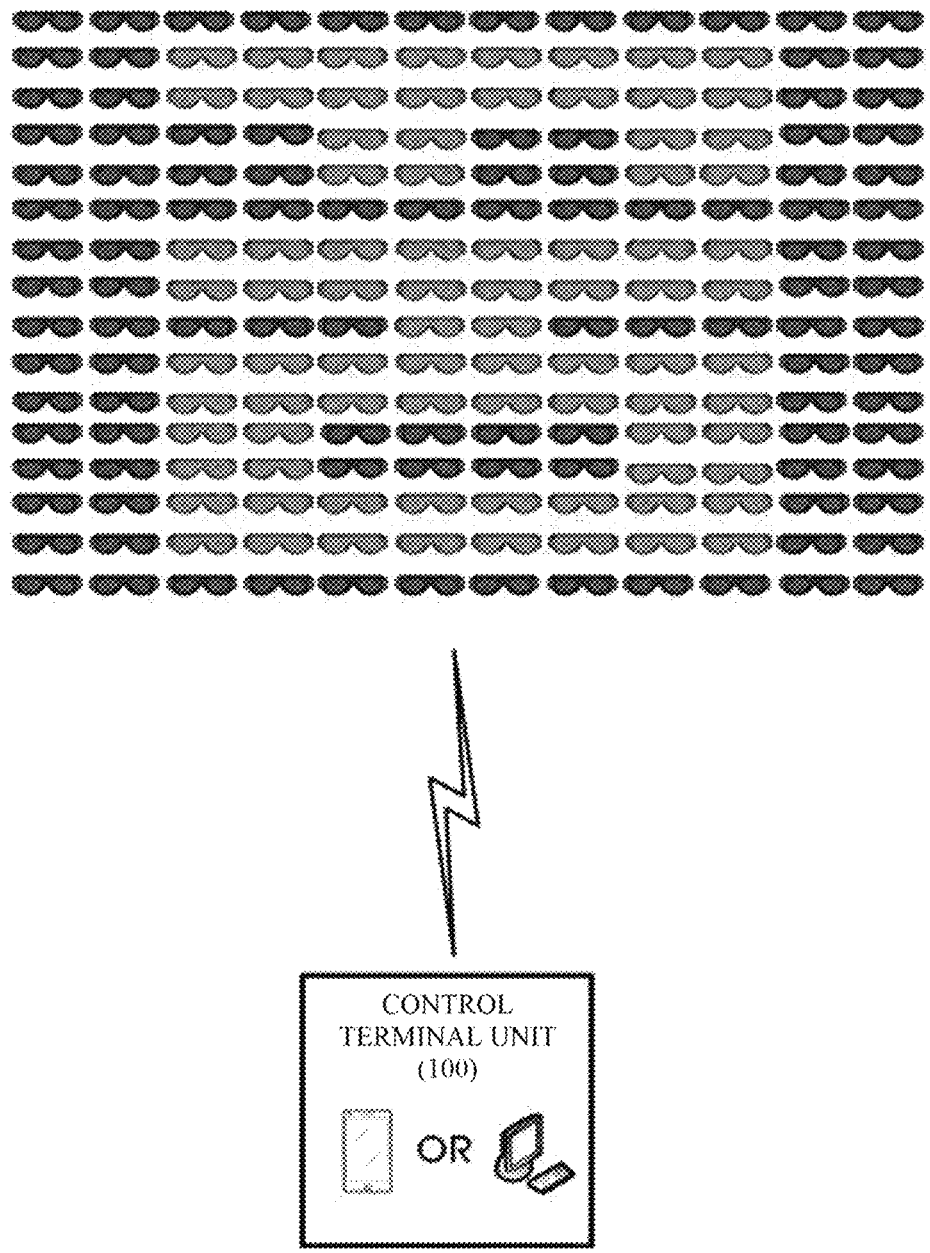
FIG. 9 is a view illustrating an embodiment of a mass game using a plurality of pairs of light emitting diode eyeglasses.

In an embodiment, as illustrated in FIG. 9, a mass game may be implemented by using the plurality of pairs of light emitting diode eyeglasses 10. Here, a mass game refers to a performance made by a plurality of persons or devices. First, the server 200 receives arrangement information of the plurality of pairs of light emitting diode eyeglasses 10. For example, a pair of light emitting diode eyeglasses of column 1 and row 1, a pair of light emitting diode eyeglasses of column 1 and row 2, a pair of light emitting diode eyeglasses of column 1 and row 3, . . . , a pair of light emitting diode eyeglasses of column 10 and row 9, and a pair of light emitting diode eyeglasses of column 10 and row 10 are specified. Thereafter, the mass game module 220 of the server 200 converts the input or generated pattern data to pattern data for a mass game. That is, pattern data on "dream" are transmitted to the server 200 when a word of "dream" is input to the text input window (see FIG. 16) of the control terminal unit 100, the mass game module 220 of the server 200 converts the pattern data to pattern data for a mass game based on the arrangement information of the plurality of light emitting diode eyeglasses 10 and controls overall operations of the pairs of light emitting diode eyeglasses 10 as a whole to output a mass game screen. In detail, as illustrated in FIG. 9, the pairs of light emitting diode eyeglasses of column 1 and row 1 to column 1 and row 12 may maintain an off state, and the pairs of light emitting diode eyeglasses of column 2 and row 1, column 2 and row 2, column 2 and row 11, and column 2 and row 12 may maintain an off state, and the pairs of light emitting diode eyeglasses of column 2 and row 3 to column 2 and row 10 may maintain an on state. Further, in addition to a still image, one image may be implemented by changing output states of the plurality of pairs of light emitting diode eyeglasses 10 over time. In this case, in order to implement an image, the mass game module 220 may produce time-stamp information on the plurality of pairs of light emitting diode eyeglasses 10, based on the content of an image and arrangement information of the plurality of pairs of light emitting diode eyeglasses 10.

Therefore, a united cheer system may be provided by controlling the plurality of pairs of light emitting diode eyeglasses 10 at the same time. Further, an LED mass game may be provided based on the arrangement of the plurality of pairs of light emitting diode eyeglasses 10. Further, a differentiated cheer tool may be achieved by outputting detected lyrics of a sound source on the plurality of pairs of light emitting diode eyeglasses 10.

Meanwhile, although the control system and method of the embodiments relate to a plurality of pairs of light emitting diode eyeglasses 10, the inventive concept is not limited thereto, but may be applied to display devices, such as a set of LEDs, a set of OLEDs, devices, such as a cathode-ray tubes, which output visual information, mobile devices, TVs, monitors, and electronic watches, instead of the plurality of pairs of light emitting diode eyeglasses 10.

According to the inventive concept, pattern data stored in advance may be shown and new pattern data may be conveniently shown on the spot through real-time communication. Further, a united cheer system may be provided by controlling the plurality of pairs of light emitting diode eyeglasses at the same time. Further, an LED mass game may be provided based on arrangement of the plurality of pairs of light emitting diode eyeglasses. Furthermore, a differentiated cheer tool may be provided by outputting detected lyrics of a sound source on the plurality of pairs of light emitting diode eyeglasses.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A pair of light emitting diode eyeglasses comprising:
an eyeglass frame that comprises a front frame that is provided with a plurality of light emitting diodes a leg frame that is connected with the front frame; and
a control unit that is provided in the eyeglass frame and configured to control driving of the light emitting diodes such that pattern data is displayed through the light emitting diodes,
wherein the plurality of light emitting diode are arranged as a matrix with a preset transverse interval and a preset longitudinal interval,
wherein an opening for securing the field of view of a front side of a user are provided in the front frame,
wherein the opening is arranged between one first row and another second row of the plurality of light emitting diode, and
wherein the center of the front frame is arranged between the first row and the second row, and
wherein the opening comprises a first opening and a second opening spaced apart from each other in the transverse direction with the center of the front frame therebetween.

2. The pair of light emitting diode eyeglasses of claim 1, wherein a portion of the front frame to correspond to eyes portion of the user is arranged between the first row and the second row.

3. The pair of light emitting diode eyeglasses of claim 1, wherein the first opening and the second opening are configured to correspond to a left eye position and right eye position of the user.

4. The pair of light emitting diode eyeglasses of claim 1, wherein the opening comprises a first opening and a second opening respectively arranged in a left region and a right region divided based on the center of the front frame,
wherein the first opening is arranged between one left first column and another left second column of the plurality of light emitting diode arranged in the left region, and
wherein the second opening is arranged between one right first column and another right second column of the plurality of light emitting diode arranged in the right region.

5. The pair of light emitting diode eyeglasses of claim 4, wherein the center of the left region is arranged between a left first row and a left second row of the plurality of light emitting diode, and
wherein the center of the right region is arranged between a right first row and a right second row of the plurality of light emitting diode.

6. The pair of light emitting diode eyeglasses of claim 1, wherein a portion of the opening is arranged between a pair of adjacent rows of the plurality of light emitting diode.

7. The pair of light emitting diode eyeglasses of claim 1, wherein the opening comprises a first slot and a second slot extending along a transverse direction of the front frame, and
wherein the first slot and the second slot are configured to have different extension lengths.

8. The pair of light emitting diode eyeglasses of claim 7, wherein the first slot and the second slot are arranged along the longitudinal direction of the front frame.

9. The pair of light emitting diode eyeglasses of claim 1, further comprising:
a memory unit configured to store the pattern data,
wherein the eyeglass frame further comprises a control button for controlling driving of the light emitting diodes, and
wherein the control unit controls driving of the light emitting diodes such that the pattern data stored in the memory unit are selected and are displayed through the light emitting diodes, based on manipulation of the control button.

10. The pair of light emitting diode eyeglasses of claim 9, further comprising:

a communication module for communicating the pattern data with a control terminal unit, wherein when the control unit communicates with the control terminal unit through the communication module, the control unit controls driving of the light emitting diodes such that the pattern data received from the control terminal unit are displayed through the light emitting diodes.

11. The pair of light emitting diode eyeglasses of claim 1, further comprising:

a communication module for communicating the pattern data with a control terminal unit, wherein when the control unit communicates with the control terminal unit through the communication module, the control unit controls driving of the light emitting diodes such that the pattern data received from the control terminal unit are displayed through the light emitting diodes.

12. A method of controlling a pair of light emitting diode eyeglasses by using a control unit of the pair of light emitting diode eyeglasses, the method comprising:

receiving, by the control unit, pattern data from an external server through a communication module provided in the pair of light emitting diode eyeglasses; and displaying, by the control unit, the pattern data on the pair of light emitting diode eyeglasses, wherein the receiving comprises:

transmitting a sound detected by the pair of light emitting diode eyeglasses or a control terminal unit in communication with the control unit to the external server;

receiving, by the control unit, the pattern data comprising a specific waveform or text derived by an analysis of the external server for the sound, and wherein the control unit controls the pair of light emitting diode eyeglasses based on an operation signal received from the control terminal unit.

* * * * *